United States Patent

Stuebe et al.

[15] 3,643,229

[45] Feb. 15, 1972

[54] INTERRUPT ARRANGEMENT FOR DATA PROCESSING SYSTEMS

[72] Inventors: Thomas D. Stuebe, Arvada, Colo.; Pedro A. Lenk, Rochester; John C. Gifford, Phelps, both of N.Y.

[73] Assignee: Stromberg-Carlson Corporation, Rochester, N.Y.

[22] Filed: Nov. 26, 1969

[21] Appl. No.: 880,158

[52] U.S. Cl. .......... 340/172.5

[51] Int. Cl. .......... G06f 9/18

[58] Field of Search .......... 340/172.5

[56] References Cited

UNITED STATES PATENTS

| | | | |
|---|---|---|---|
| 3,222,647 | 12/1965 | Strachey | 340/172.5 |
| 3,298,001 | 1/1967 | Couleur et al. | 340/172.5 |
| 3,353,160 | 11/1967 | Lindquist | 340/172.5 |
| 3,312,951 | 4/1967 | Hertz | 340/172.5 |
| 3,359,544 | 12/1967 | Macon et al. | 340/172.5 |
| 3,377,579 | 4/1968 | Wissick et al. | 340/172.5 |
| 3,395,394 | 7/1968 | Cottrell | 340/172.5 |
| 3,434,111 | 3/1969 | Schmidt et al. | 340/172.5 |
| 3,444,525 | 5/1969 | Barlow et al. | 340/172.5 |
| 3,456,244 | 7/1969 | Seichter et al. | 340/172.5 |

*Primary Examiner*—Raulfe B. Zache
*Assistant Examiner*—Jan E. Rhoads
*Attorney*—Craig, Antonelli and Hill

[57] ABSTRACT

Interrupt process and circuit for data processing systems wherein interrupts are provided on a priority basis with suitable means for temporary inhibit of an interrupt being provided.

17 Claims, 10 Drawing Figures

INVENTORS
THOMAS D. STUEBE,
PEDRO A. LENK and
BY JOHN C. GIFFORD
Craig, Antonelli, Stewart & Hill
ATTORNEYS

INTERRUPT ARRANGEMENT FOR DATA PROCESSING SYSTEMS

BACKGROUND OF THE INVENTION

The present invention relates in general to data processing systems, and more particularly to an interrupt process and arrangement for use in connection with stored program data processing systems.

Technology in the field of electronic data processing systems has advanced with the provision of the stored program system. Such facilities provide for control by a stored program consisting of various commands, instructions and routines for directing system operations and satisfy the various system requirements. Periodically the stored program interrogates the memory which maintains a record of the current status of the controlled equipment. Each control operation requires performance of some control activity and results in the retrieval from the memory of an address of a discrete location in the stored program. The proper sequence of commands to satisfy the specific requirement is then obtained from this discrete location and executed by components performing various functions throughout the system.

However, from time to time during the course of execution of a program in control of the operation of a system, it is necessary to obtain immediate consideration of other more important problems. It is therefore necessary in most data processing systems utilizing stored program techniques to provide some interrupt arrangement whereby the central processor can be caused to interrupt the program being executed at the beginning of the next instruction in response to receipt of an interrupt signal so that the data processing system can be used to execute another command having a higher priority. Upon completion of the interrupt program, the processor can be caused to return to execution of the main program from the point of interruption. Such interrupt arrangements have been provided in the past in connection with data processing systems; however, these presently available interrupt arrangements and processes have required a complexity of hardware and an involved sequence of interrupt operations of their performance.

It is accordingly a general object of the present invention to provide an interrupt process and arrangement for use in connection with stored program data processing systems which eliminates or otherwise inherently avoids the disadvantages accompanying known systems and processes of a similar nature.

It is a more specific object of the present invention to provide an interrupt process and arrangement for use in stored program data processing systems which has greatly simplified hardware requirements and is based upon an expandable interrupt circuit having N levels of interrupt.

More particularly, the arrangement in accordance with the present invention provides for priority control wherein higher order interrupts will interrupt lower order interrupt programs, if in progress at the time, or inhibit their execution, if their lower order interrupts appear during the execution of the higher order interrupt. Upon recognition of an interrupt, program control is transferred to an interrupt servicing program, and a return to the program being executed at the time the interrupt occurred will take place at the end of the interrupt programs, by means of a go-back-to-normal command GBN.

BRIEF DESCRIPTION OF THE DRAWINGS

These and other objects, features and advantages of the present invention will become more apparent from the following detailed description thereof when taken in conjunction with the accompanying drawings which illustrate an exemplary embodiment of the present invention, and wherein.

GENERAL DESCRIPTION

Figure 1:
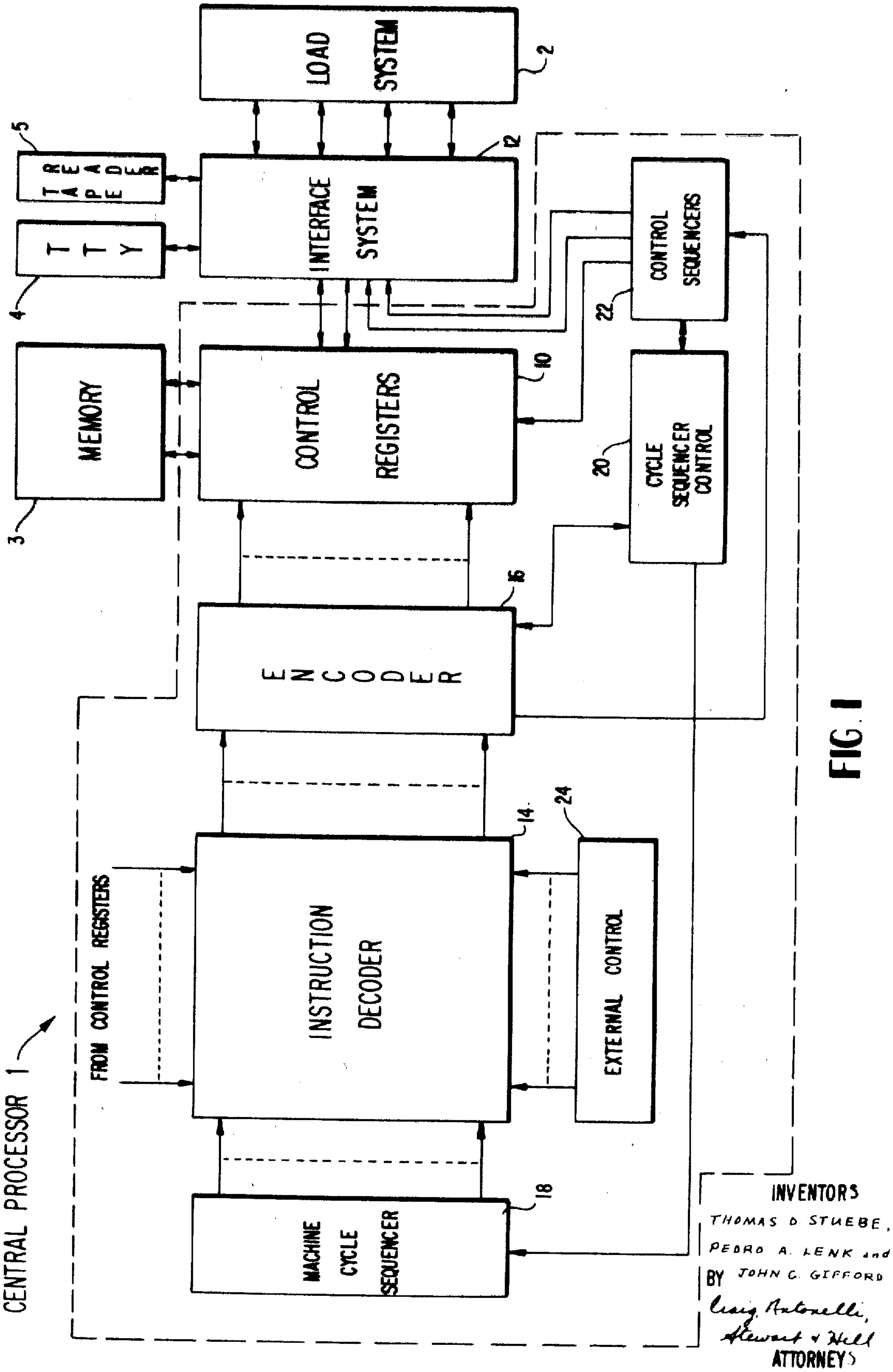
FIG. 1 is a schematic block diagram of a data processing system which provides an example for purposes of explaining the present invention.

In the basic block diagram of a data processing system of FIG. 1, a central processor 1 operates to provide the necessary control signals for controlling operation of the load system 2 in accordance with the conditions existing in the load system, which are detected and stored in the memory 3, and pursuant to a set of instructions forming one or more programs also stored in the memory 3. The introduction of data into the central processor is accomplished through use of, for example, a teletype unit 4 and a tape reader 5, which permit the introduction or alteration of programs and individual instructions and make possible the interruption of the operation of the central processor for purposes of introducing special requests for service as required.

The central processor 1 consists of a combination of elements which analyze data received from the load system, determine from the instructions stored in the memory 3 the necessary steps required in view of the analyzed data, determine the sequence of steps to be performed within the selected instruction and generate the necessary control signals for application in control of the load system 2. Data is transferred to the load system 2 by way of a series of control registers 10, a peripheral bus 11 and an interface system 12. The series of control registers 10 provide the means for introducing into or deriving data and instructions from the memory 3 and includes the necessary registers and computing elements for performing analysis on the data derived from the load system 2 and from the memory 3 in accordance with the programs stored in the memory 3 and for generating the necessary control signals which are applied through the peripheral bus 11 to the interface system 12 in control of the load system 2.

Operation of the control registers 10 takes two basic forms, that is, an instruction or instructions derived from the memory 3 in coded form indicating the necessary control required for a given set of circumstances must be decoded to a form representing a plurality of individual operative steps through which the various control registers are driven so as to achieve the desired output control to the load system 2 and the proper sequence of the required steps must be determined and the operation of the individual control registers must be regulated in accordance with this predetermined sequence. Accordingly, the central processor 1 includes an instruction decoder 14 which receives a coded instruction from the control registers 10 and decodes this coded instruction by providing a series of outputs representative of a plurality of individual operation cycles which make up the given instruction. These operation cycles in turn consist of a plurality of options which are determined by an encoder 16 connected to the output of the instruction decoder 14. Outputs representing the operation of each cycle forming an instruction are then applied from the encoder 16 to the control registers 10 in control thereof.

The sequence in which the respective cycles of a given instruction are applied to the control registers 10 is determined by a machine cycle sequencer 18 under control of a cycle sequencer control 20. The machine cycle sequencer 18 determines the sequence of the outputs enabled from the instruction decoder 14 and effectively steps from one cycle to the next cycle in sequence upon indication from the cycle sequencer control 20 that all of the steps of a given cycle have been completed so that the next cycle may be initiated. The cycle sequencer control 20 also controls a plurality of control sequencers 22 in response to control signals received from the encoder 16, the control sequencers 22 providing for controlled operation of the control registers 10 and peripheral interface system 12 as required for the various steps of the cycles of a given instruction.

The general control system of FIG. 1 is illustrated in greater detail in connection with FIGS. *2a* and *2b*. Looking first to FIG. *2b*, which illustrates the control registers 10 associated with the memory 3, it is seen that nine registers are provided for the manipulation and control of data and instructions and an arithmetic and logic unit ALU is provided for transfer and computation of the data as required by the stored instructions.

The control registers include a memory address register MAR which is primarily used to present an address to the memory 3 indicating the storage position in the memory into which data is written or from which data is derived. There is also provided a memory buffer register MBR which stores the data to be inserted into the memory or extracted therefrom at the memory position determined by the address stored in the memory address register MAR. In order to write into the memory, the address is transferred into the memory address register MAR and the contents to be written into the memory are transferred into the memory buffer register MBR. The control from the read/write sequencer *22c* (FIG. *2a*) effects the necessary transfer of data into the memory at the proper memory location. To read data from the memory, a similar operation occurs with the data being extracted from the memory at the location determined by the address in the memory address register MAR, the data being transferred to the memory buffer register MBR upon application of control to the memory from the read/write sequencer *22c*.

The control registers also include an instruction address register IAR which contains the address of the instruction about to be executed or the address of the instruction which has just been executed. This register is provided in association with the instruction register ISR which contains the instruction being executed, which instruction is derived from the series of instructions forming the plurality of programs stored in the memory 3.

A hardware register HWR performs a plurality of functions including the storage of instructions received in parallel from the instruction register ISR for various operations and the storage of the address of peripheral equipment and certain information relating to interrupts.

As indicated above, when the contents of an address in the memory is desired, a read command is given. Similarly, when the status of a peripheral device is desired, a scan command is given. The address of the desired peripheral device is first placed into the hardware register HWR and then gated through a peripheral address interface 35 presenting the address to the address bus. Upon sending out the scan pulse or command from the peripheral sequencer *22d*, forming another of the control sequencers 22, the status of the peripheral device appears on the peripheral data bus and is entered through a peripheral data interface 36 into the scan register SNR. On the other hand, when data is to be sent to a peripheral device, the address of the peripheral device is placed in the hardware register HWR and the data to be sent to the peripheral device is placed in a distribute register DTR. Upon generation of a distribute pulse by the peripheral sequencer, the data stored in the distribute register DTR is then outpulsed to the peripheral equipment.

Finally, the control registers include a pair of programable or addressable registers X and Y, which registers are utilized for the various operations specified in the stored programs, with the execution of instructions not serving to change the contents of these registers unless the instruction explicitly indicates that a change of the contents is required.

The arithmetic and logic unit ALU is a unit which performs the necessary arithmetic and logic functions attendant to the carrying out of the programs stored in the memory. This unit includes two data inputs designated A and B and a single data output designated C. There are two buses 30 and 31 that lead to the unit ALU, with one of the buses 30 connecting the output of various registers to the A input and the other bus 31 connecting various registers to the B input to the unit. Thus, the flow of data generally from and to the various control registers occurs in a clockwise manner via the buses 30 and 31 to the inputs A or B of the unit ALU and out by way of the outputs C via the bus 32 to the input of the registers. In this regard, it should be noted that the instruction register ISR and the distribute register DTR are not connected to either input of the unit ALU. Data is never transferred serially out of the instruction register ISR but is transferred in parallel to the instruction decoder or the hardware register HWR. With regard to the distribute register DTR, since this register is used only to distribute information to the peripheral data bus in parallel, no data is transferred serially out of this register. With the exception of the hardware register HWR, the scan register SNR and the memory buffer register MBR, registers can only be loaded by serially transferring data through the arithmetic and logic unit ALU.

There is also included in combination with the control registers a number generator 34 which is connected to the data buses 30 and 31 and is used to gate certain numbers into the inputs A or B of the unit ALU when requested by the encoder 16. Thus, numerical values may be inserted into various registers or numbers in the registers may be incremented by the number generator.

FIG. *2a* provides the instruction decoder/encoder and timing arrangement for the processor 1. This section tells the central control and the control registers shown in FIG. *2b* what they are supposed to do and when they are supposed to do it. The contents of the instruction register which represent an instruction in a binary code are applied to the instruction decoder 40 which decodes the instruction by enabling one out of N leads that goes to the instruction cycle decoder 42. Each of the output leads 1—N of the instruction decoder 40 therefore represents a single unique one of the instructions forming the various programs stored in the memory. As indicated previously, each instruction includes one or more cycles of operating functions with each cycle being broken down into one or more operating steps. Thus, the first step is determining the required operations which must be performed in response to a particular instruction is to determine the sequence of cycles required for the particular instruction. The instruction cycle decoder 42 determines those cycles which make up a particular instruction in response to receipt of an enabling signal on one of the lines 1—N from the instruction decoder 40.

Since each cycle of an instruction must be performed in a particular sequence, the main section of the machine cycle sequencer 18 provides a plurality of outputs to the instruction cycle decoder 42, which output leads are enabled sequentially in response to control from the cycle sequencer control 20 so that the output from the instruction cycle decoder 42 will represent control information as to each cycle of the particular instruction in its particular order or sequence. The encoder 16 connected to the output of the instruction cycle decoder 42 then determines from the information received at its input the particular operation of each cycle which must be performed. Thus, the encoder determines what control leads are to be enabled (such as enable the X register to the A input of the arithmetic and logic unit ALU, tell the arithmetic and logic unit ALU to transfer, and enable the C output to the Y register) and these instructions are generated by the encoder in the sequence determined by the control sequencers 22 under control of the cycle sequencer control 20.

There is some work at the start of an instruction that is identical for all instructions. As an example, the instruction when read from memory must be transferred from the memory buffer register MBR into the instruction register ISR. This is accomplished by a preprocessing cycle which is performed prior to actual carring out of any instruction. Thus, the machine cycle sequencer 18 contains a section designated PRE which provides the sequence of steps to carry out the preprocessing cycle. The output of this PRE section of the machine cycle sequencer 18 is connected to a preprocessing cycle decoder 44 which determines the various cycles of the preprocessing instruction. The output from the preprocessing cycle decoder 44 is connected to the encoder 16 which then determines each cycle of the preprocessing instruction in the same manner as the other instructions derived through the instruction cycle decoder 42.

In the same manner, certain work is common at the end of every instruction; for example, the next instruction in the stored program must be read. This is accomplished by the OUT instruction, and since this instruction is provided after completion of one of the general instructions, the machine cycle sequencer 18 provides a section designated OUT which is connected through an OUT cycle decoder 45 to the encoder 16 which then determines the individual steps of each cycle of the OUT instruction.

Thus, the machine cycle sequencer is provided in such a way that a preprocessing instruction is always carried out prior to a general instruction and an OUT instruction is always carried out at the conclusion of a general instruction. The machine cycle sequence 18 therefore steps progressively through the preprocessing instruction, a general instruction and then the OUT instruction with each step being initiated through control from the cycle sequencer control 20.

The output lead 50 from the encoder 16 represents a plurality of control leads which extend to various gates and control elements in the control registers illustrated in FIG. **2*b*. Thus, in accordance with the particular steps of each cycle of a given instruction, the various gates and registers may be enabled to perform the necessary functions required by the instruction. In addition, outputs from the encoder 16 are provided to the control sequencers 22 which include a clock distribute control 22*a*, a bit sequencer 22*b*, a read/write sequencer 22*c*, a peripheral sequencer 22*d* and a move sequencer 22*e*. Each of the control sequencers 22*a*–22*e* are enabled from the cycle sequencer control 20 so that each performs its required function as determined by the outputs from the encoder 16** in a particular sequence or order.

The control sequencers **22*a*–22*e* generally provide for an indexing or outpulsing of data from one register to another or to or from the memory under control of the clock 22*g* which is connected to each of these sequencers. For example, the clock distribute control 22*a* applies clock pulses to all of the registers and the number generator. The bit sequencer 22*b* is connected to the ALU circuit to tell the ALU circuit when to test a bit and is connected to the clock distribute control 22*a* to control the serial operation of all the bits in the register. The read/write sequencer 22*c*** is connected to the memory and serves to effect a transfer of data or instructions thereto or therefrom.

The peripheral sequencer **22*d* applies the contents of the HWR Register to the peripheral address bus during the entire period data is to be distributed to, or received from, the load system 2, by applying a control signal to actuate the peripheral address interface 35. During distribute period, the peripheral sequencer 22*d* applies a control signal to actuate the peripheral data interface 36 to continuously transmit the data stored in the DTR Register to the peripheral data bus. During the middle of the distribute period, the peripheral sequencer 22*d* generates a distribute enable pulse on the distribute enable line that enables the peripheral devices to act on the address and data being transmitted. In the scan period (receiving information from the load), the peripheral sequencer 22*d* generates the scan enable pulse during the middle of the period so that the peripheral unit addressed gates data on the peripheral data bus. At the trailing edge of the scan enable pulse, the peripheral data interface 36 is enabled by the peripheral sequencer 22*d*** to transmit the data from the peripheral data bus to the SNR Register.

A move sequencer **22*e*** generates a reset pulse and enables one clock pulse to the HWR Register that causes the parallel entry of information into the HWR Register.

The interrupt control 47 provides a means through which the processor program can be interrupted at the beginning of the next-following instruction after presence of an interrupt signal has been detected. The processor is caused to execute a special program to service the interrupts. Upon completion of the interrupt program, the processor is returned to complete the execution of the main program.

As indicated above, there are times when certain operations must be performed requiring the interrupting of programs already in process. In fact, it can occur that a program which has interrupted a given program may itself be interrupted by a higher priority program. In order to provide for automatic interrupt within the data processing system at various levels of interrupt and inhibit the present invention provides an interrupt process and arrangement.

In order to cause the processor to interrupt a program in the process of execution, at the beginning of the following instruction, an interrupt signal is generated within the system which is detected at the beginning of the next instruction and serves to transfer operation of the processor to an interrupt program stored in the memory. There are N levels of interrupt built into the system, with two memory locations being reserved for each interrupt level. One memory location is in the program area and is called ISA (interrupt starting address). The ISA contents are defined initially by the assembler and are as permanent and as fixed as the program stored in the memory.

Before the execution of each command, the processor tests for interrupts. Thus, at the beginning of each instruction performed by the processor, a determination is first made as to whether an interrupt is present before the instruction is begun. If no interrupt is present, the instruction can be executed. Conversely, if an interrupt request of level N is found, the present program address is stored in a location of the memory, called IRA (interrupt return address) corresponding to the level N of interrupt, and the program control is transferred to the locations specified in the ISA of the same level. The saving of the contents of the X and Y registers may be performed by the program provided for this machine.

At the end of the interrupt program, the instruction GBN (go-back-to-normal) will complete the interrupt, returning program control to the location specified in the IRA location of the corresponding level in the memory. However, interrupts can also be inhibited by the particular program being executed. In this case, interrupt requests of the inhibited level are not honored by the processor until the program has removed the inhibit.

DETAILED DESCRIPTION

The basic principles of the invention will first be explained by way of example, and then more specific descriptions of the process and hardware in accordance with the present invention will be presented. For purposes of example, it is assumed that four levels of interrupt are provided in the system and the contents of the ISA and IRA memory locations for each interrupt level and the inhibit condition thereof are set forth in the following chart A.

CHART A

| Interrupt Level | IRA | ISA | Inhibit |
|---|---|---|---|
| 1 | 1001 | 90 | No |
| 2 | | 150 | No |
| 3 | | 45 | YES |
| 4 | | 280 | No |

As indicated in the above chart, it is presumed initially that interrupt level 3 is inhibited and also that a level 1 interrupt is on by the beginning of the execution of the instruction in location 1001. The instructions starting at location 90 in the memory are then executed.

Suppose that a level 2 interrupt now occurs during execution of the instruction relating to interrupt level 1 in location 95. At the beginning of the instruction in location 96, the interrupt is recognized and 96 is stored in IRA at level 2 as indicated in the following chart:

CHART B

| Interrupt Level | IRA | ISA | Inhibit |
|---|---|---|---|
| 1 | 1001 | 90 | No |
| 2 | 96 | 150 | No |
| 3 | | 45 | YES |
| 4 | | 280 | No |

The instructions starting at location 150 are then executed. Suppose, however, that a level 3 interrupt occurs during execution of the level 2 interrupt program at location 154 in the memory. The processor does not see this interrupt since it is inhibited, and therefore it continues execution of the program at the level 2 interrupt.

Suppose now that the level 2 program is completed and a go-back-to-normal GBN instruction has been executed. The processor branches to the instruction in location 96, where it left off in the interrupt level 1 program so that the condition of the two memory areas is once again as indicated in connection with Chart A. During the execution of the instruction in location 98 a level 4 interrupt occurs. At the beginning of the next instruction, the interrupt is recognized and 99 is stored in IRA at level 4, as indicated in the following Chart C:

CHART C

| Interrupt Level | IRA | ISA | Inhibit |
|---|---|---|---|
| 1 | 1001 | 90 | No |
| 2 | | 150 | No |
| 3 | | 45 | YES |
| 4 | 99 | 280 | No |

The instructions starting at location 280 are executed at this time. If it is now presumed that the instruction at location 281 of the memory turns off the level 3 inhibit, execution of the level 4 program will continue since level 3 is of lower priority than level 4. At the completion of the level 4 program, a go-back-to-normal GBN instruction is executed which turns off the level 4 interrupt and branches to the instruction in location 99. The condition of the memory locations is now as indicated in the Chart D.

CHART D

| Interrupt Level | IRA | ISA | Inhibit |
|---|---|---|---|
| 1 | 1001 | 90 | No |
| 2 | | 150 | No |
| 3 | 99 | 45 | No |
| 4 | | 280 | No |

At the beginning of the instruction in location 99 where the program at interrupt level 1 left off, the level 3 interrupt, that occurred before the level 3 inhibit, is recognized. Thus, 99 is stored in IRA at level 3 at this time and the processor shifts to program location 45 at this time in level 3. Chart E now indicates the condition of the memory locations.

CHART E

| Interrupt Level | IRA | is a | Inhibit |
|---|---|---|---|
| 1 | 1001 | 90 | No |
| 2 | | 150 | No |
| 3 | 99 | 45 | No |
| 4 | | 280 | No |

At the completion of the level 3 interrupt program, a go-back-to-normal GBN instruction is executed and the processor shifts back to location 99 in the interrupt level 1, so that the condition of the memory locations is that indicated in Chart A. At the completion of the level 1 interrupt program control is at last transferred back to the main line program at location 1001.

The aforegoing example illustrates the various interrupt operations which can be performed in accordance with the present invention. The description provides in general the manner in which the various priorities are observed and the way in which various interrupt levels may be inhibited and subsequently observed in response to removal of the inhibit. A more specific description of the process in accordance with the present invention will now be provided.

There are certain operations at the start of each instruction that are identical for all instructions. As an example, the instruction when read from the memory must be transferred from the memory buffer register MBR into the instruction register ISR, before being transferred to the instruction decoder 40 for further control over the operation of the processor. These preliminary operations are accomplished by the PREPROCESSING (P) cycles. In a like manner, there are certain operations at the end of each of the instructions which are identical for all instructions. As an example, the next instruction must be read. This is accomplished by the OUT (O) cycles. The machine cycle sequencers also include the general or main body of instructions which various combinations perform the steps of the programs stored in the memory. There are also a group of instructions which provide for displaying of contents of the memory and initial starting of a program with the instruction being defined by the position of a selector switch on the front panel of the processor.

Figure 3:
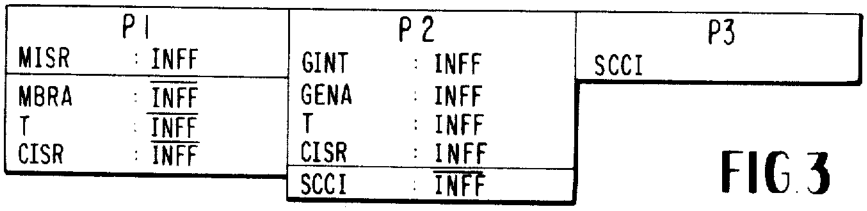
FIG. 3 is a chart of the cycles of the preprocessing instruction performed by the system of FIG. 1.

Beginning with the preprocessing cycles by which the processor transfers the next instruction from the memory buffer register into the instruction register, FIG. 3 indicates the three cycles of this instruction. As indicated previously, the preprocessing instruction is wired into the preprocessing cycle decoder 44 so that performance of this preliminary operation is carried out without use of the instruction decoder 40 or the instruction cycle decoder 42.

Figure 2A:
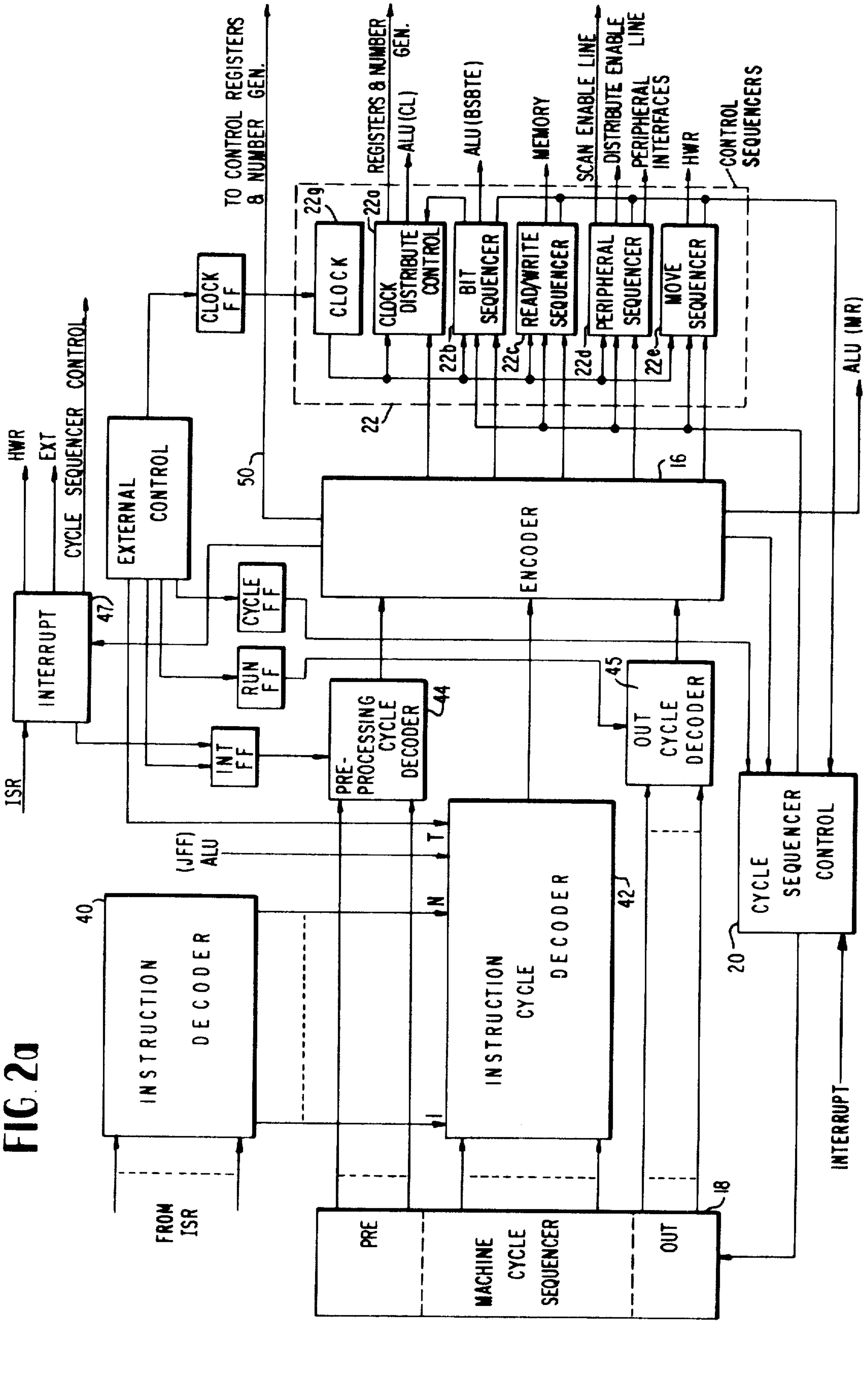
FIGS. 2*a* and 2*b*, when combined, provide a more detailed schematic diagram of the system of FIG. 1.
Figure 2B:
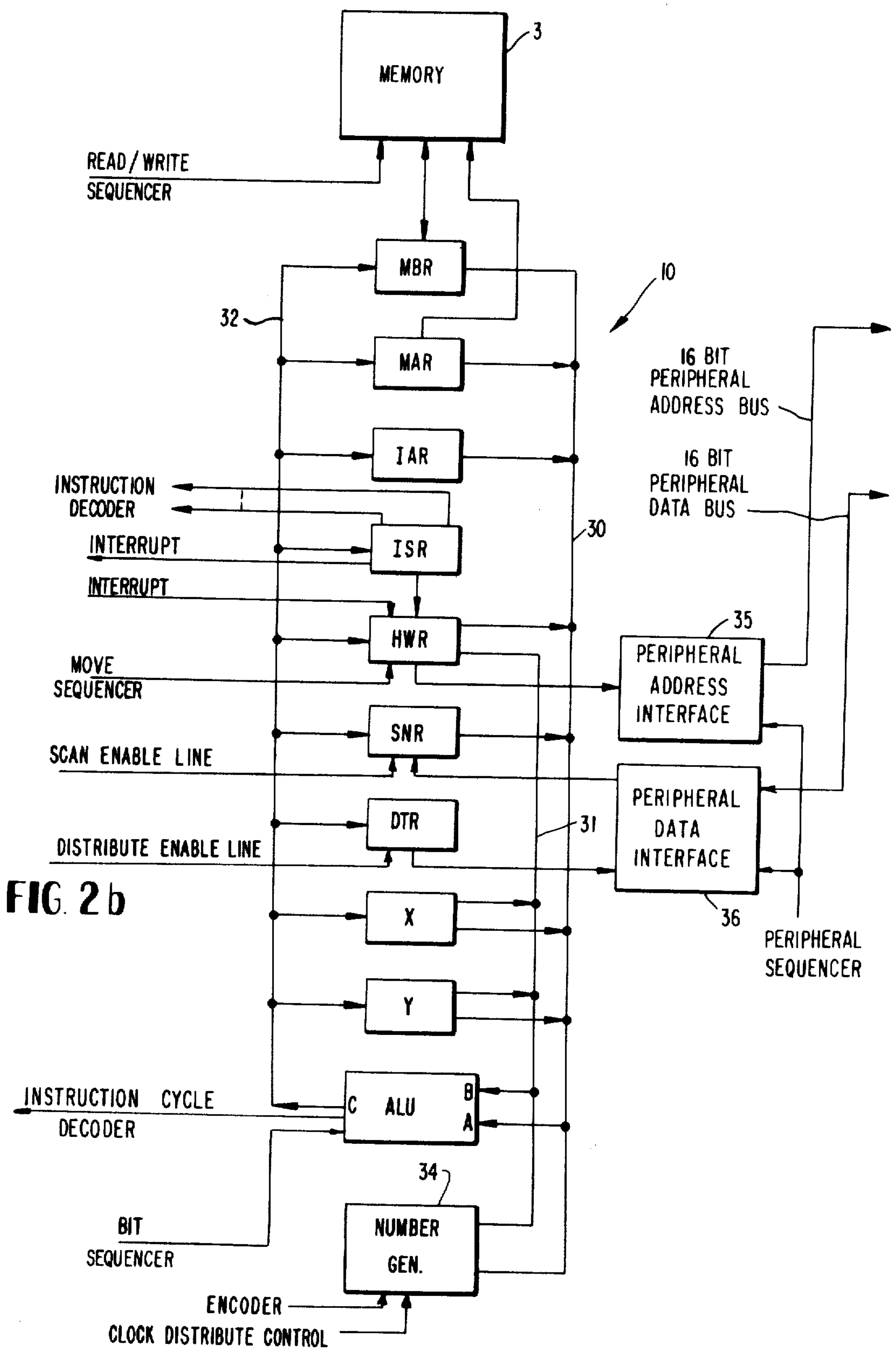

During the first cycle P1 of the preprocessing instruction, a test is made of the interrupt flip-flop (FIG. 2*a*) to determine whether an interrupt of the next instruction for purposes of performing another more important operation is effected. If the interrupt flip-flop is a "1," the cycle P1 instructs that the data in the instruction register ISR be moved to the hardware register HWR. If the interrupt is a "0," the memory buffer register MBR will be connected to the A input of the ALU and the instruction register will be connected to the C output of the ALU, which will then perform a transfer operation T under control of the encoder so that the data in the memory buffer register MBR will be transferred to the instruction register ISR.

During cycle P2, if the output of the interrupt flip-flop is equal to "1," the interrupt instruction is generated by the number generator (GINT) and the output of the number generator is connected to the A (GENA) input of the ALU which effects a transfer operation of the generated number to the instruction register via the C output of the ALU (CISR). On the other hand, if the interrupt flip-flop was found to be "0," the data in the memory buffer register (MBR) will have been transferred to the instruction register (ISR) during cycle P1 so that during cycle P2 the processor is set to the main cycle C1 (SCC1) of the machine cycle sequencer so that the instruction stored in the instruction register can be carried out. Cycle P3 of the preprocessing instruction merely transfers the processor to the main cycle C1 after an interrupt has been determined and the required instruction is gated into the instruction register.

At the conclusion of a main instruction the processor performs the instruction OUT necessary to determine the next main instruction to be performed and to read this instruction from the memory. In the first cycle O1 the output of the instruction address register IAR is connected to the A input of the ALU. The number generator is connected to the B input of the ALU, which then adds a single bit to the number advancing it to the next number in sequence. The output of ALU is then connected to the instruction address register IAR and the memory address register MAR. During the cycle O2, the data in the memory position designated by the address stored in the memory address register is read into the memory buffer register MBR in preparation for the next preprocessing instruction. During cycle O3, if the run flip-flop is a "1" the cycle is omitted; whereas, if the run flip-flop is a zero, the cycle flip-flop is reset. During the cycle O4, the processor is set to the cycle P1 of the preprocessing instruction. Also, the jump flip-flop is reset so as to enable it for tests during the next instruction sequence.

Figure 4:
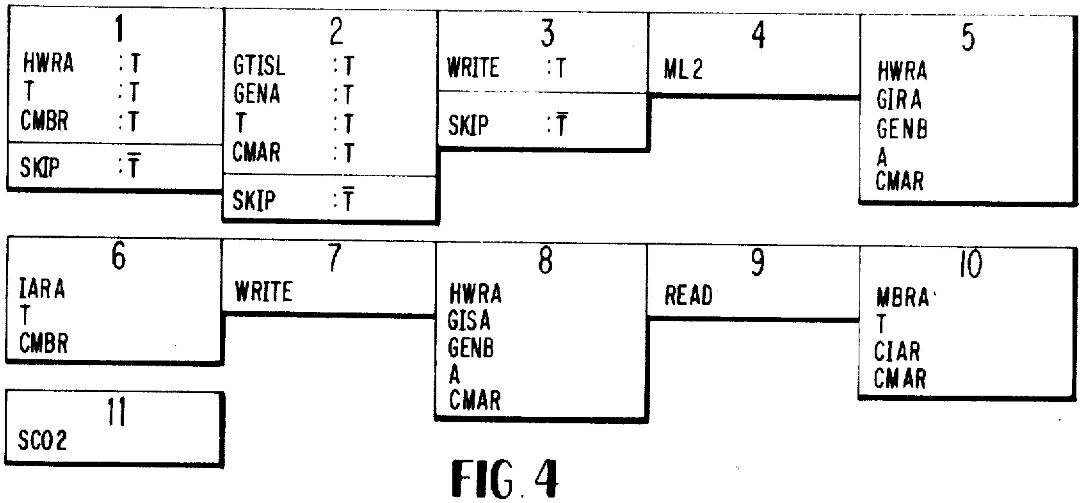
FIG. 4 is a chart of the steps of the interrupt process in accordance with the present invention.

FIG. 4 presents the format of the interrupt instruction in accordance with the present invention. At the beginning of the interrupt instruction the instruction address register IAR contains the address of the instruction that was to be executed but has been interrupted. The instruction register ISR contains the interrupt instruction and the memory address register MAR contains the same data that is in the instruction address register IAR. The memory buffer register MBR contains the instruction that was to be executed, and the hardware register HWR as a result of the preprocessing instruction contains the instruction that was just executed.

The highest order interrupt is called the trace interrupt T. A trace interrupt is a special type of interrupt that can, for example, be used as a debugging aid for the system programs. If the trace interrupt is not on, T will equal zero and the first three cycles of the interrupt instruction will be skipped. The trace interrupt is executed when a trace switch in external control (FIG. 2A) applies a trace signal (T equals "1") to the instruction cycle decoder. If T equals "1" the contents of the hardware register HWR (the old instruction) will be transferred into the memory buffer register MBR in cycle 1. In cycle 2, the traced instruction storage location (a 16-bit designation) is generated by the number generator and transferred into the memory address register MAR. In cycle 3 a write pulse is sent to the memory so that the contents of the memory buffer register MBR will be stored in the memory in the location designated by the address in the memory address register MAR. This series of cycles causes the old instruction to be stored in dedicated position in the memory, the address of this dedicated position being called the traced instruction storage location.

The other levels of interrupt (other than trace) skip directly to cycle 4. In cycle 4 of the instruction the L2 field is moved into the hardware register HWR from the interrupt circuit 47, this field indicating to the processor what level the highest order interrupt is. It is generated by interrupt hardware which will be described in greater detail hereinafter. In cycle 5 of the instruction, the interrupt return address base location will be generated by the number generator and added to the hardware register and placed in the memory address register. Note that the hardware register contained the level of the highest order interrupt at this tune, so that the addition of the interrupt level to the base address provides the return address of the particular interrupt level in the memory. After cycle 5, the memory address register MAR contains the interrupt return address IRA storage location for the interrupt it is servicing, as shown in the previous description of interrupts.

In cycle 6 of the instruction the contents of the instruction address register IAR (the address of the instruction that was to be executed) is transferred into the memory buffer register MBR. During cycle 7, the contents of the memory buffer register is written into the interrupt return address IRA storage location. Now that the return address is safely stored away, the interrupt instruction has to get the starting address of the interrupt program written for that specific level.

In cycle 8 the interrupt start address ISA base location is added to the data in the hardware register and is transferred to the instruction address register and the memory address register. At this point is should be recalled that the contents of the hardware register is the level of the interrupt being serviced. In cycle 9 of the instruction a read pulse is sent to the memory so that the memory buffer register MBR now contains the starting address of the interrupt program corresponding to the level shown in the hardware register HWR.

In cycle 10 of the instruction the starting address is transferred into the instruction address register IAR and the memory address register MAR. The interrupt instruction is then finished. Cycle 11 sets the sequencer to OUT 2 instead of OUT 1, since it is desirable not to increment the instruction address register. Upon completion of the interrupt program it is desirable to return the program that was being executed before the interruption. The go-back-to-normal GBN instruction accomplishes this.

Figure 5:
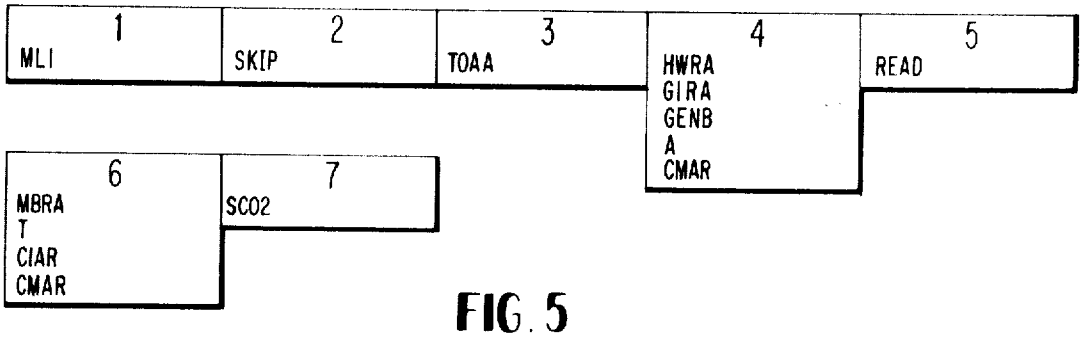
FIG. 5 is a chart of the go-back-to-normal instruction forming part of the process in accordance with the invention.

Looking now to FIG. 5 which illustrates the format of the GBN instruction, in cycle 1, the L1 field is moved into the hardware register HWR, and this field, which is in the go-back-to-normal instruction, is equal to the level of the interrupt that caused the processor to branch into the interrupt program. Cycle 2 is skipped over to cycle 3 during which the appropriate acknowledge (the acknowledge of the interrupt just serviced) is turned off. This allows lower order interrupts to come in.

During cycle 4 of the instruction, the level of interrupt (contained in the hardware register HWR) is added to the interrupt return address base location and transferred to the memory address register. In cycle 5 of the instruction a read pulse is sent to the memory so that the memory buffer register now contains the address of the instruction that was interrupted. In cycle 6, this address is transferred to the instruction address register and the memory address register. Cycle 7 sets the sequencers to OUT 2 so that execution of the program that was interrupted can continue.

As indicated above, it is sometimes desirable to inhibit an interrupt from occurring. In this case, the processor acts as if that level of interrupt did not occur. However, in accordance with the present invention, if an interrupt occurred during the time it was inhibited, it will come in as soon as the inhibit is removed.

Figure 6:
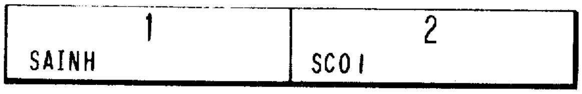
FIG. 6 is a chart of the set-inhibit instruction forming part of the process in accordance with the present invention.
Figure 7:
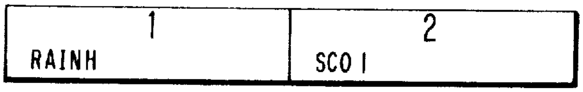
FIG. 7 is a chart of the remove-inhibit instruction forming part of the process in accordance with the present invention.

The set inhibit instruction SINH, the format of which is set forth in FIG. 6, provides the appropriate inhibit during cycle 1 and exits to OUT 1 during cycle 2. The removed inhibit instruction RINH, the format of which is illustrated in FIG. 7, removes the appropriate inhibits during cycle 1 and exits to OUT 1 during cycle 2. Notice that any combination of the interrupts can be inhibited during a single set inhibited instruction execution. Also, any or all inhibits can be removed during a single remove inhibit instruction execution.

Figure 8A:
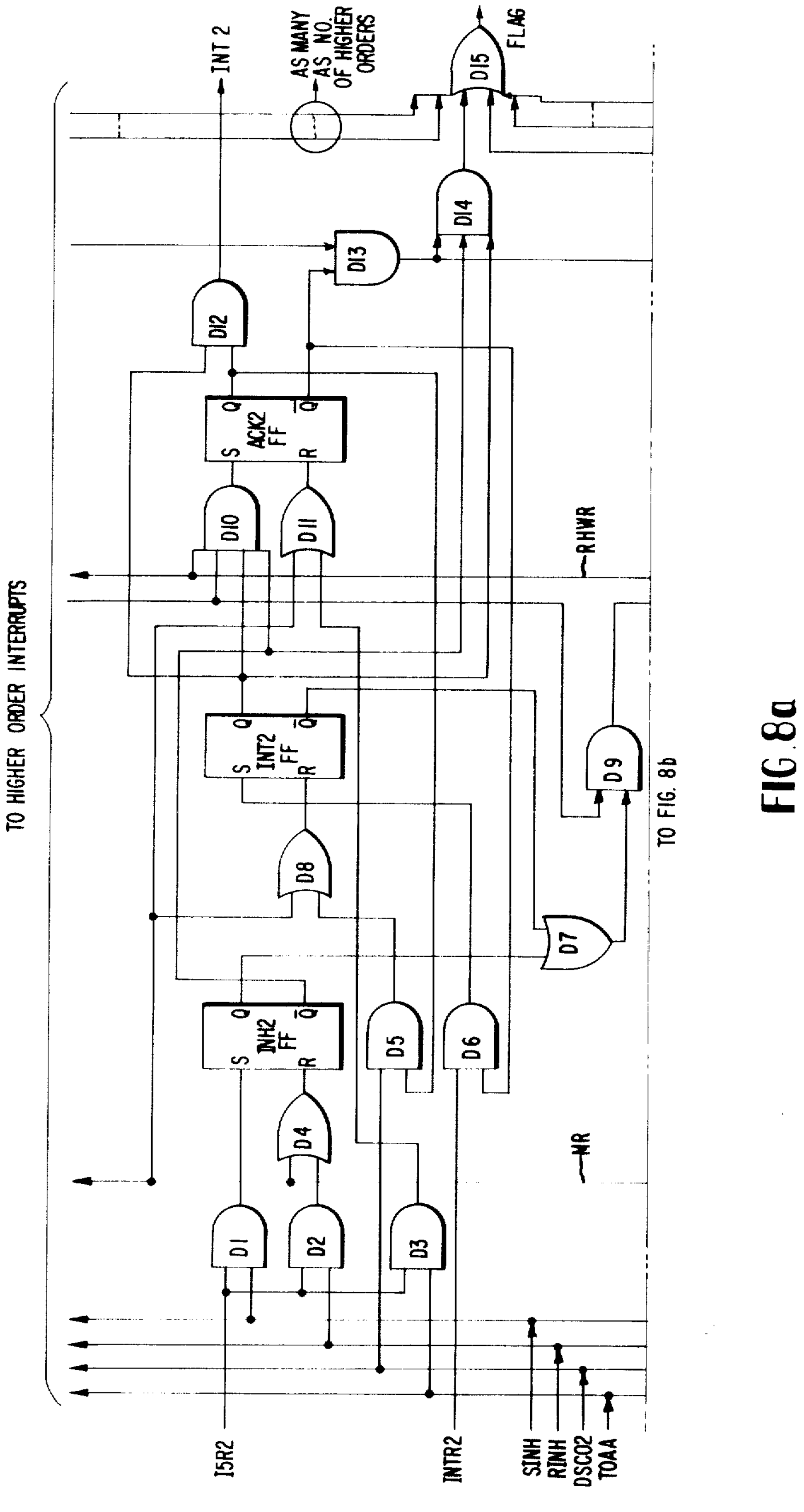
FIGS. 8*a* and 8*b*, when combined, provide a schematic circuit diagram of an interrupt circuit in accordance with the present invention.
Figure 8B:
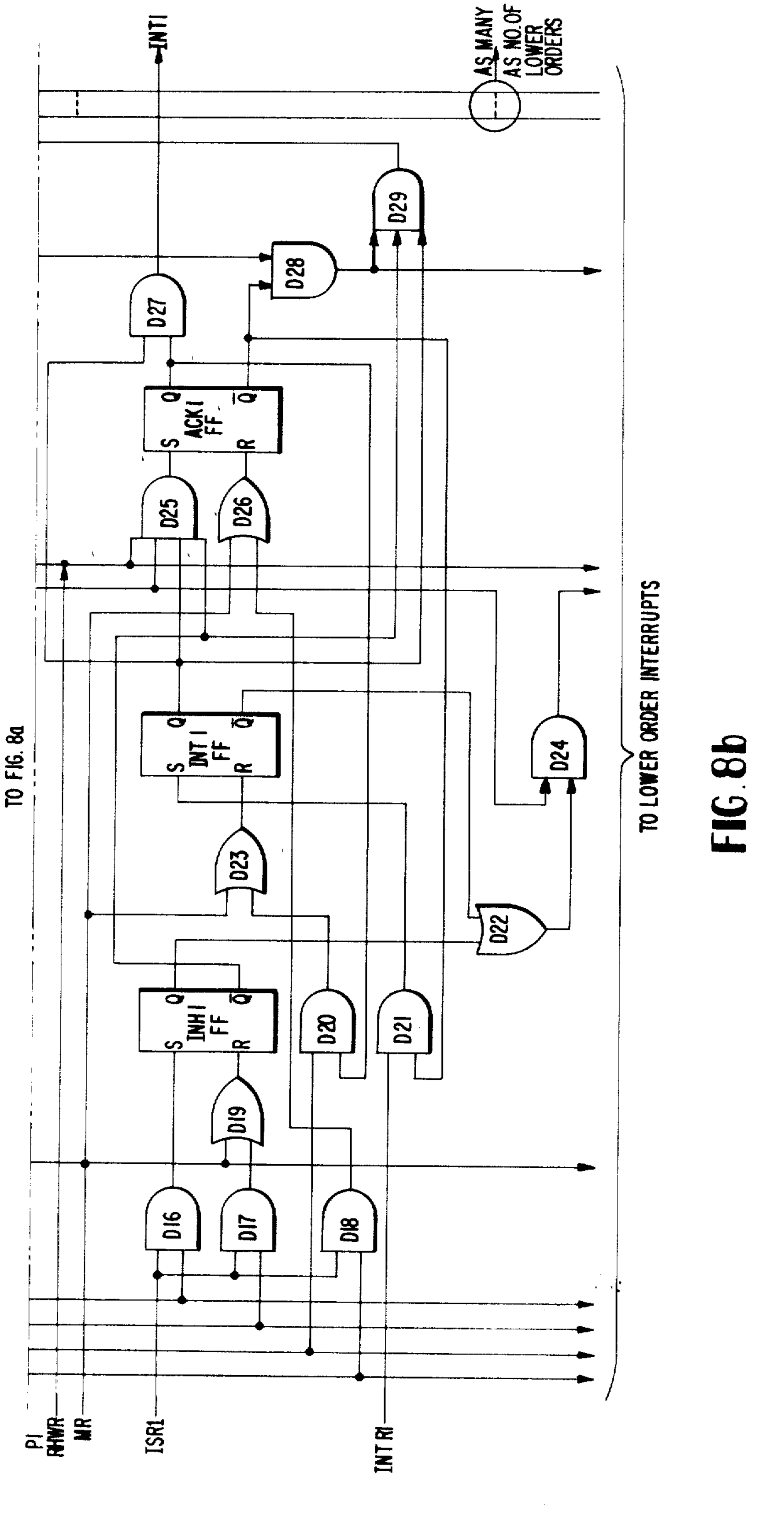

FIGS. 8*a* and 8*b* when combined provide a two-level interrupt circuit in accordance with the present invention, which is directly expandable to N levels. Each interrupt level in the circuit includes an inhibit flip-flop INH, an interrupt flip-flop INT and an acknowledge flip-flop ACK.

The FLAG output from the gate D15 corresponds to the interrupt flip-flop INFF referred to in the foregoing description of the invention. When this output FLAG equals 1, there is an indication that at least one new (not acknowledged or inhibited) interrupt exists. The INT outputs on the other hand denote an acknowledge interrupt request. As is apparent, if the number of interrupt levels is not equal to 2, the INT outputs must be encoded to binary; however, if only two levels of interrupt are provided, the outputs will already appear in binary and no encoding will be necessary.

In operation of the circuit in accordance with the present invention initially all flip-flops are reset and will remain reset until an interrupt request is present, i.e., until INTR1="1" or INTR2="" at the inputs to the circuit. If a level 2 interrupt is requested, a "1" will appear at the INTR 2 input to the circuit which is connected to the input of AND-gate D6. This gate is enabled by the $\overline{Q}$ output of the acknowledge flip-flop ACK2 and thereby sets the interrupt flip-flop INT2. The Q output of the interrupt flip-flop in 2 is applied on the one hand to AND-gate D14 which is enabled from the $\overline{Q}$ output of the reset acknowledge flip-flop ACK2 (via AND-gate D13) and the $\overline{Q}$ output of the reset inhibit flip-flop INH2. The output of AND-gate D14 is applied through OR-gate D15 to provide a FLAG output from the circuit indicating that an interrupt is requested. The Q output of the interrupt flip-flop INT2 is also applied to AND-gates D10 and D12; however, since the acknowledge flip-flop ACK2 is reset, the AND-gate D12 is inhibited by the zero in the Q output of the flip-flop.

During the P1 cycle of the preprocessing instruction, a signal P1 RHWR="1" is applied to the input of AND-gate D10 from decoder 44 via encoder 16 enabling the gate and thereby setting the acknowledge flip-flop ACK2. The "1" at the Q output of ACK2 then enables AND-gate D12 to make the INT2 output a "1," thereby acknowledging the interrupt.

Suppose for purposes of example that both the INTR1 and INTR2 inputs to the system come up simultaneously. The interrupt flip-flop INT2 will be enabled in the same manner as indicated above and the INT1 flip-flop will also be enabled via AND-gate D21. The Q outputs of the interrupt flip-flops INT2 and INT1 are then gated through the AND-gates D14 and D29, respectively, and OR-gate D15 making the output FLAG equal to 1. However, at this point, due to AND-gates D6 and D21, no output is provided either at INT2 or INT1 since the respective acknowledge flip-flops ACK2 and ACK1 are both reset.

During the P1 cycle of the preprocessing instruction, the input P1·RHWR will enable the AND-gate D10 to set acknowledge flip-flop ACK2 as indicated above; however, as a result of the set condition of interrupt flip-flop INT2, the output of OR-gate D7 connected to the Q output of the inhibit flip-flop INH2 and the $\overline{Q}$ output of the interrupt flip-flop INT2 will be "0." Hence, the output of AND-gate D9 will be a "0" preventing enabling of the AND-gate D25 and therefore preventing the enabling of the acknowledging flip-flop ACK1 from the Q output of the interrupt flip-flop INT1. Therefore, the INT1 output will remain "0" throughout execution of the level 2 interrupt, thereby precluding execution of the level 1 interrupt which is of lower priority. The output of AND-gate D14 is now "0" as a result of the setting of acknowledge flip-flop ACK2, and since the output of gate D13 will block gate D28, gate D29 will be blocked and the output FLAG from the OR-gate will be removed. The output FLAG informs the processor only in the case where a higher order interrupt is awaiting service. As a result of this arrangement, higher order interrupts will prevent action in connection with lower order interrupts until the higher order interrupt has been completed and this priority is accomplished by suitable control of the gates in each interrupt section corresponding to the gates D10 and D14 from the output of gates corresponding to gates D9 and D13, respectively.

The last cycle of the interrupt program which is serving the second level interrupt is the cycle OUT 2. In setting the machine cycle sequencer to the OUT 2 cycle, an input is received at DSCO2 from encoder 16 in the interrupt circuit applying the Q output of the acknowledge flip-flop ACK2 through the AND-gate D5 and OR-gate D8 to reset the interrupt flip-flop INT2. In this regard, it should be noted that as a result of the AND-gate D5, the input at DSCO2 will not reset the interrupt flip-flop unless the acknowledge flip-flop of that interrupt level is also set. Thus, the input at DSCO2 will not reset the interrupt flip-flop INT1 because the acknowledge flip-flop ACK1 is reset and the Q output thereof to the gate D20 is a "0." Therefore, the input DSCO2 resets only the interrupt level which was just serviced. The go-back-to-normal instruction GBN issues a TOAA (turn off appropriate acknowledge) command from encoder 16, and at the same time, the instruction register applies a "1" to the ISR2 input to the system. This results in enabling of the AND-gate D3, the output of which is applied through OR-gate D11 to reset the acknowledge flip-flop ACK2.

The level 2 interrupt is now reset, and the FLAG output is once again provided from the system. Although the interrupt program has just been completed, this FLAG output is interrogated again as the first step of the main program execution (during the preprocessing instruction).

On finding a 1, control is once more branched to the interrupt program. Assuming that the level 1 interrupt is not inhibited, the P1 cycle of the interrupt program now enables AND-gate D25 as a result of the "1" received from the output of AND-gate D9, the second level interrupt having now been completed and the inhibit and interrupt flip-flops of this level being reset. Thus, the acknowledge flip-flop ACK1 will be set from the Q output of the interrupt flip-flop INT1 thereby enabling the AND-gate D27 to provide a "1" at the output INT1. With the setting of the acknowledge flip-flop ACK1, the AND-gate D29 is no longer enabled so that no FLAG output is provided by the OR-gate D15. On completion of the program the input DSCO2 resets the interrupt flip-flop INT1 and simultaneous inputs TOAA and ISR1 reset the acknowledge flip-flop ACK1. The outputs INT1, INT2 and FLAG are each now "0,"therefore, main program execution continues until a new interrupt request comes in.

Suppose that during execution of the first level interrupt, the second level interrupt is signified by generation of INTR2. The INT1 flip-flop will be set via gate D21 in the manner already described and a FLAG output will be generated from gate D15 as a result of the enabling of gate D14, thereby indicating that a higher order interrupt than presently being executed has been requested by the system. As a result, when the instruction presently being executed is completed, even though this is not the last instruction in the level 1 program, the next instruction in the level 1 program will be stored in the IRA location in the memory and execution of the level 2 instructions will be initiated. However, since the acknowledge flip-flop ACK1 has already been set, it will remain set as an indication of the level of interrupt which has been interrupted. Thus, the acknowledge flip-flops (ACK) provide a nesting type of arrangement of interrupt by providing hardware that remembers the level of interrupt program that is being processed and also remembers the interrupt programs that have been interrupted.

Suppose, however, that at completion of the program relating to the interrupt 2 level the level 1 interrupt had been inhibited, the inhibit flip-flop INH1 having been set via the AND-gate D16 from the input ISR1 from the instruction register and enabled by the input SINH from encoder 16. The output $\overline{Q}$ of the inhibit flip-flop INH1 being a "0" would have blocked AND-gates D29 and D25. As a result, the output FLAG would have been "0" and the processor would have continued to execute the main program. However, the interrupt flip-flop INT1 would still have been set so that upon removal of the inhibit, i.e., upon resetting of the inhibit flip-flop INH1 via AND-gate D17 upon receipt of an input RINH, the output FLAG would immediately become "1" indicating that a lower level interrupt is awaiting execution.

The preceding description of the present invention has been provided in conjunction with a particular stored program system merely to aid in gaining an understanding of the function of the interrupt circuit in accordance with the present invention and to illustrate its application to a typical data processor. However, it is believed that the present invention is adaptable to any interrupt application wherein: (1) interrupt functions having assigned priorities or levels are serviced in order of descending priority; (2) lower order interrupt requests are not destroyed, but rather are ignored until all higher order requests are serviced; (3) a FLAG output is need to inform external circuitry that a request is waiting for service; (4) output leads defining the order of the acknowledged interrupt are needed; and (5) the capability to inhibit any level by external circuitry is required.

It is claimed:

1. A multilevel interrupt circuit for use in connection with stored program data processing systems, comprising:

a plurality of individual interrupt circuits, each capable of providing an interrupt control signal representing a different interrupt level, first gating means interconnecting said individual interrupt circuits for permitting establishment of only one interrupt control signal at a time in the order of priority of said individual circuits, interrupt indicator means connected to all of said individual interrupt circuits for providing an indicator signal only when an interrupt circuit is actuated by an interrupt request at a time when no interrupt is in process or higher order interrupt circuit is actuated by an interrupt request subsequent to a lower order interrupt circuit being actuated, and each individual interrupt circuit including interrupt means for storing an interrupt request, and acknowledge means actuated only by a stored interrupt in said interrupt means coincident with an indication of a lack of a stored interrupt in all other individual interrupt circuits of higher priority from said first gating means for generating an interrupt control signal.

2. A multilevel interrupt circuit as defined in claim 1, wherein said interrupt indicator means includes an OR gate providing said indicator signal, a first AND gate in each individual interrupt circuit having its output connected to said OR gate, a first input enabled by said interrupt means upon actuation thereof and a second input, and a second AND gate in each individual interrupt circuit having an output connected to said second input of said first AND gate and inputs connected to acknowledge means of the same interrupt circuit and to all higher priority acknowledge means, and said second AND gate being enabled only during the nonactuated condition of said acknowledge means.

3. A multilevel interrupt circuit as defined in claim 1, wherein said first gating means includes in each individual interrupt circuit a third AND gate having an output connected to said acknowledge means for actuation thereof, a first input connected to the interrupt means and enabled thereby, a second input connected to all higher priority individual interrupt circuits and enabled only when the interrupt means therein is deactuated, and a third input connected to an external control source for successively actuating the acknowledge means in the circuits which have been actuated.

4. A multilevel interrupt circuit as defined in claim 1, wherein each individual interrupt circuit further includes a fourth AND gate having a pair of inputs connected respectively to the outputs of said interrupt means and said acknowledge means for providing the interrupt control signal only when both means are actuated.

5. A multilevel interrupt circuit as defined in claim 4, wherein each individual interrupt circuit further includes inhibit means responsive to an inhibit signal for preventing actuation of said acknowledge means by said interrupt means.

6. A multilevel interrupt circuit as defined in claim 3, wherein each individual interrupt circuit further includes an inhibit flip-flop having a SET input responsive to an inhibit command for providing an inhibit signal at a SET output and having a RESET output providing a RESET signal when said flip-flop is reset, and said RESET output of said inhibit flip-flop being connected to the third AND gate of the same individual interrupt circuit.

7. A multilevel interrupt circuit as defined in claim 6 wherein the SET output of said inhibit flip-flop in each individual interrupt circuit is connected to the third AND gate in the individual interrupt circuit of next lower priority.

8. A multilivel interrupt circuit as defined in claim 1 wherein said interrupt means and said acknowledge means are provided in the form of respective flip-flops.

9. In connection with a data processing system utilizing stored program techniques, including a memory containing a plurality of selected storage areas and a central processor controlled by various programs of instructions stored in the memory, a multilevel interrupt process comprising:

storing in different storage areas of said memory a separate program of instructions for each level of interrupt, each program having a uniquely assigned starting address, storing in said memory the starting address of said interrupt programs of instructions at successive locations representing respective levels of interrupt, such that said interrupt program locations are offset from a predetermined interrupt start address base number by different preset numbers corresponding to different levels of interrupt, providing at successive locations in said memory an interrupt return program location for each respective level of said interrupt, such that each said return program location is offset from a predetermined interrupt return base number by the preset number corresponding to its respective level of interrupt, commencing execution of a given program stored in said memory, detecting a request for interrupt having a given level at the start of a given instruction within said program of stored instructions being executed, deriving the location in said memory of the interrupt return location of said given level of interrupt by adding the preset number, corresponding to said given level, to the interrupt return base number, storing the address of said given instruction in said memory at the interrupt return location provided for said given level of interrupt, deriving the location of the starting address of the interrupt program of instructions corresponding to said given level of interrupt by adding the preset number, corresponding to said given level, to the interrupt start address base number, obtaining from said memory, at said location derived in the preceding step, the starting address of the corresponding interrupt program of instructions, and transferring the interrupt program of instructions beginning at said assigned starting address in said memory to said central processor for effecting execution thereof.

10. Process as defined in claim 9, including a step of returning said given instruction to a storage location in said memory from said central processor.

11. Process as defined in claim 10, wherein the step of returning said given instruction to a storage location in said memory includes providing a temporary storage location in said memory other than the location at which said instruction was initially stored, and transferring said given instruction to said temporary storage location.

12. Process as defined in claim 9, including the further steps of executing said interrupt program of instructions, detecting completion of execution of the interrupt program of instructions, obtaining the address of said given instruction from the interrupt return location provided for said given level of interrupt, and transferring the given instruction, stored in the memory at the address obtained, to the central processor for continuing execution of said given program.

13. In connection with a data processing system utilizing stored program techniques, including a memory containing a plurality of selected storage areas and a central processor controlled by various programs of instructions stored in the memory, a multilevel interrupt process comprising:

storing in different storage areas of said memory a separate program of instructions for each level of interrupt, each program having a uniquely assigned starting address, storing in said memory the starting address of said interrupt programs of instructions at successive locations representing respective levels of interrupt, such that said interrupt program locations are offset from a predetermined interrupt start address base number by different preset numbers corresponding to different levels of interrupt, providing at successive locations in said memory an interrupt return program location for each respective level of said interrupt, such that each said return program location is cffset from a predetermined interrupt return base number by the preset number corresponding to its respective level of interrupt, commencing execution of a given program stored in said memory, detecting a first request for interrupt having a given level at the start of a given instruction within said program of stored instructions being executed, deriving the location in said memory of the interrupt return location of said given level of interrupt of said first request by adding the preset number, corresponding to said given level, to the interrupt start address base number, storing the address of said given instruction in said memory at the interrupt return location provided for said given level of interrupt, deriving the location of the starting address of the interrupt program of instructions corresponding to said given level of interrupt by adding the preset number, corresponding to said given level, to the interrupt start address base number, obtaining from said memory, at said location derived in the preceding step, the starting address of the corresponding interrupt program of instructions, transferring the interrupt program of instructions beginning at said assigned starting address in said memory to said central processor for effecting execution thereof, detecting a second request for interrupt, having a higher level than the given level of said first request, at the start of one instruction in said interrupt program of instructions corresponding to said given level of said first request, deriving the location in said memory of the interrupt return location of said higher level of interrupt of said second request by adding the preset number, corresponding to said higher level, to the interrupt return base number, storing the location of said one interrupt program instruction in said memory at the interrupt return location provided for said higher level of interrupt of said second request, deriving the location of the starting address of the interrupt program of instructions, corresponding to said higher level of said second interrupt request, by adding the preset number, corresponding to said higher level, to the interrupt start address base number, obtaining from said memory, at said location derived in the preceding step, the starting address of the corresponding interrupt program of instructions, and transferring the higher level interrupt program of instructions, beginning at its assigned starting address in said memory, to said central processor for effecting execution thereof.

14. Process as defined in claim 13, including the steps of returning said one interrupt program instruction into a storage location in said memory from said central processor.

15. Process as defined in claim 14, wherein the step of returning said one interrupt program instruction to a storage location in said memory includes providing a temporary storage location in said memory for said one interrupt program instruction other than the location at which said instruction was initially stored, and transferring said one interrupt program instruction to said temporary storage location.

16. Process as defined in claim 13, including the further steps of executing said interrupt program of instructions corresponding to said higher level of interrupt, detecting completion of execution of said higher level interrupt program of instructions, obtaining the address of said one interrupt program instruction from the instruction return location provided for said higher level of interrupt, and transferring said one interrupt instruction, stored in the memory at the address obtained in the preceding step, to the central processor for continuing execution of said interrupt program of instructions corresponding to said given level of interrupt.

17. Process as defined in claim 16, including the further steps of executing said interrupt program of instructions corresponding to said given level of interrupt, detecting completion of execution of said given level interrupt program of instructions, obtaining the address of said given instruction from the interrupt return location provided for said given level of interrupt, and transferring the given instruction, stored in the memory at the address obtained in the preceding step, to the central processor for continuing execution of said given program.

* * * * *